United States Patent Office 3,213,111
Patented Oct. 19, 1965

3,213,111
EPOXY ESTERS OF 3,4-EPOXY-CYCLOHEXANE-1-CARBOXALDEHYDE ACETALS
Hans Batzer, Rainweg 7, Arlesheim, Switzerland; Willy Fisch, Stelzenackerstrasse 11, Binningen, Switzerland; and Erwin Nikles, Untere Rebgasse 16, Basel, Switzerland
No Drawing. Filed Sept. 3, 1963, Ser. No. 306,281
Claims priority, application Switzerland Sept. 17, 1959, 78,334/59; Mar. 25, 1960, 3,374/60
4 Claims. (Cl. 260—340.9)

This application is a continuation-in-part of application Serial No. 54,582, filed September 8, 1960 and now abandoned.

The present invention provides new acetals that contain at least two epoxide groups and correspond to the formula $$\left[ \text{(structure with } R_1 \text{ to } R_9, Z\text{-G-)} \right]_n Y \quad (I)$$

in which $R_1$ to $R_9$ each represents a hydrogen atom or a monovalent substituent such as a halogen atom, an alkoxy group or an aliphatic, cycloaliphatic, araliphatic or aromatic hydrocarbon radical, and $R_1$ and $R_5$ together may also represent an alkylene radical such as a methylene group; Z represents a trivalent aliphatic, cycloaliphatic or araliphatic hydrocarbon radical with at least 3 carbon atoms, none of which has more than a single free valence, and no carbon atom having such a free valence carries a hydroxyl group; G represents a group $$\diagup\!\!\!\!\diagdown\!\!\!\!\text{O}, \quad \diagup\!\!\!\!\diagdown\text{C=O} \quad \text{or} \quad \diagup\!\!\!\!\diagdown\text{C=O}$$

$n$ is a small whole number and Y represents an aliphatic, cycloaliphatic, araliphatic or aromatic radical with $n$ free valences and, when $N=1$, the radical Y must contain at least one epoxide group.

More particularly, the present invention provides new diepoxide compounds of the formulae (I)

compounds of the formula (II)

compounds of the formula $$\cdots Z-O-C-[Y]_{n-1}-C-O-Z \cdots \quad (III)$$

compounds of the formula $$\cdots Z-O-C-A_1 \quad (IV)$$

and compounds of the formula $$\cdots Z-O-A_2 \quad (V)$$

in which $R_1$ and $R_5$ taken together form a member selected from the class consisting of two hydrogen atoms, two lower alkyl radicals having 1 to 4 carbon atoms, and one methylene radical, $R_2$, $R_3$, $R_4$, $R_6$, $R_7$, $R_8$ and $R_9$ each represents a member selected from the class consisting of hydrogen atom and lower alkyl group having 1 to 4 carbon atoms, Z represents the hydrocarbonradical of a trihydric aliphatic alcohol, Y represents the hydrocarbon radical of a dicarboxylic acid, $A_1$ is a member selected from the class consisting of epoxyalkyl and epoxycycloalkyl, $A_2$ is a member selected from the class consisting of epoxyalkyl, epoxycycloalkyl and the radical of the formula $$-\text{CH}-\text{CH}_2-\text{CH} \diagup\!\!\!\!\diagdown \cdots \quad (VI)$$

where R is selected from the class consisting of hydrogen atom and the methyl group, and $n$ represents an integer of at least 1 and at the most 2.

The acetals containing epoxide groups of the present process are obtained by treating an unsaturated acetal of the general formula

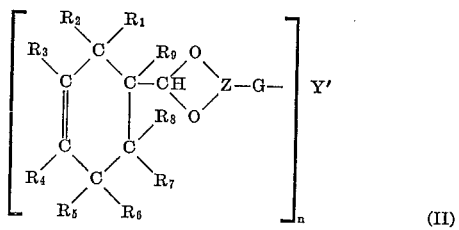 (II)

in which $R_1$ to $R_9$, Z, G and $n$ have the same meanings as in the formula (I) and Y′ represents an aliphatic, cycloaliphatic, araliphatic, or aromatic radical and, when $n=1$, the radical Y′ contains at least one epoxidizable group or an epoxide group—with an epoxidizing agent.

The term "epoxidizable group" refers above all to residues containing epoxidizable carbon-to-carbon double bonds, such as an allyl, butenyl or tetrahydrobenzyl radical; by treating such carbon-to-carbon double bonds, for example with organic per-acids, they can be epoxidized to form the 1:2-epoxide group.

The term "epoxidizable group" further designates radicals containing a halohydrin grouping

in which Hal represents a halogen atom, such as a β-methylglycerol-α-monochlorohydrin radical or a glycerol-α-mono-chlorohydrin radical. It is known that such a halohydrin group can likewise be converted into a 1:2-epoxide group by treatment with a dehydrohalogenating agent.

The starting materials of the Formula (II) are obtained, for example, when in a first stage an aldehyde of the formula

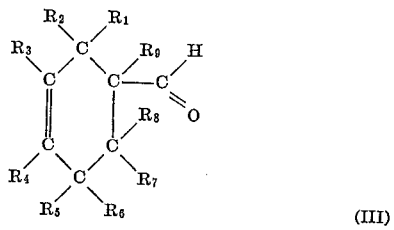 (III)

is acetalized with a polyalcohol of the formula

 (IV)

The third functional group G′ in the polyalcohol (IV) is preferably likewise a hydroxyl group, but it may also represent a halogen atom, such as chlorine or bromine, or a group

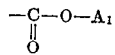

in which $A_1$ represents a hydrogen atom or a lower alkyl radical.

The aldehydes of the Formula (III) are derivatives of tetrahydrobenzene; as examples may be mentioned Δ³-tetrahydrobenzaldehyde, 6-methyl-Δ³-tetrahydrobenzaldehyde and 2:5-endomethylene-Δ³-tetrahydrobenzaldehyde.

Suitable polyalcohols of the Formula (IV) are: Triols such as glycrol, trimethylolethane, trimethylolpropane, butanetriol-(1:2:4), 1:2:6-hexanetriol, 2:4-dihydroxy-3-hydroxymethylpentane; halohydrins such as glycerol-α-mono-chlorohydrin, glycerol-β-chlorohydrin, glycerol-α-bromohydrin and glyceric acid.

The acetylation may follow the known pattern, and consist for example in heating an aldehyde of the Formula (III) together with a dialcohol or polyalcohol (IV) in the presence of an acid catalyst such, for example, as hydrochloric acid or para-toluenesulfonic acid.

Furthermore 1 mole of an aldehyde of the Formula (III) may be added on to 1 mole of an epoxide of the formula

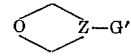 (V)

In either case the reaction product is an acetal of the formula

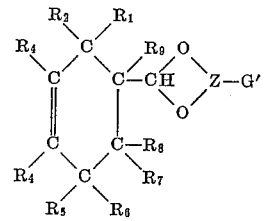 (VI)

The conversion of the compound (VI) into the unsaturated acetal of the Formula (II) depends on the nature of the functional group G′. A suitable method is condensation, such as etherification, esterification or reesterification with a reactive compound containing, for example, one or more mobile halogen atoms, or groups containing active hydrogen atoms. Likewise suitable is an additive combination of an α:β-unsaturated compound with one or several carbon-to-carbon double bonds.

In this connection two basically different cases must be distinguished:

(1) The reactive compound used for the reaction with the acetal (VI) contains an epoxide group or an epoxidizable group, for example an epoxidizable carbon-to-carbon double bond which does not participate in the reaction with the acetal (VI). In this case it is possible to use reactive compounds containing only one reactive group such, for example, as a mobile halogen atom, a hydroxyl or carboxyl group.

(2) The reactive compound used is free from epoxide groups or epoxidizable groups that do not undergo reaction already with the acetal (VI). In this case the reactive compounds must contain at least two reactive groups, such for example, as mobile halogen atoms, hydroxyl or carboxyl groups or olefinic carbon-to-carbon double bonds capable of addition on to hydroxyl groups or the like.

In case (1) there may be mentioned as compounds that contain epoxide groups or are epoxidizable and contain a reactive group as defined above: epihalohydrins such as epichlorohydrin; dihalohydrins such as glycerol dichlorohydrins; unsaturated alcohols such as allyl alcohol, Δ³-tetrahydrobenzyl alcohol and 6-methyl-Δ³-tetrahydrobenzyl alcohol; glycerol diesters of unsaturated fatty acids such as glycerol dioleate or glycerol dilinoleate; unsaturated carboxylic acids and functional derivatives thereof such as Δ³-tetrahydrobenzoic acid, 6-methyl-Δ³-tetrahydrobenzoic acid, oleic acid, elaidic acid, ricinoleic acid, linoleic acid, ricinenic acid, tall oil acids, soybean fatty acids, linseed oil acids, tung oil acids, crotonic acid, acrylic acid, methacrylic acid, acrylic acid methyl ester, acrylyl chloride and the like; unsaturated halides, such as allyl bromide and allyl chloride; unsaturated acetals, such as 3-vinyl-2:4-dioxospiro(5:5)undecene-8 and 3-propenyl-7-methyl-2:4-dioxospiro(5:5)undecene-8.

In case (2) there may be mentioned as saturated or unsaturated compounds containing at least two reactive groups as defined above: Saturated polyalcohols such as ethylene glycol, diethylene glycol, triethylene glycol, butanediol-1:4, glycerol, sorbitol, penta-erythritol; unsaturated poly-alcohols such as butene-(2)-diol-1:4, 1:1-bis-[hydroxyethyl]-cyclo-hexene-3 and 1:1-bis-[hydroxymethyl]-6-methylcyclohexene-3; glycerol monoesters of unsaturated fatty acids such as glycerol monooleate or glycerol monolinoleate; diphenols and polyphenols such as resorcinol, hydroquinone, bis-[para-hydroxyphenyl]-methane and 2:2-bis-[para-hydroxyphenyl]-propane; carbonic acid, phosgene and polycarboxylic acids, such as oxalic, succinic, adipic, sebacic, hexahydrophthalic, phthalic, terephthalic, maleic, fumaric, tetrahydrophthalic, pyromellitic acid and functional derivatives thereof such as their acid halides and acid anhydrides; furthermore polyhalogen compounds such as dichloromethane, dichloroethane, dibromoethane, dichlorobutene and the like; also compounds containing two or more carbon-to-carbon double bonds capable of adding on to hydroxyl groups with formation of an ether bridge, such as ethylene glycol-bis-acrylic acid esters, N:N-bis-[acrylamido]-methane and N:N':N"-triacrylyl-hexahydrotriazine-1:3:5; and bisacetals of acrolein, such as 3:9-divinyl-spiro-bi-(meta-dioxane).

Furthermore, unsaturated acetals of the Formula (II) can be prepared directly by acetalizing 2 moles of an aldehyde of the Formula (III) with 1 mole of a polyalcohol of the formula

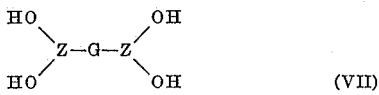

As examples of poly alcohols (VII) there may be mentioned diglycerol and ethylene glycol-diglyceric ether.

Finally, unsaturated acetals of the Formula (II) may also be prepared directly by acetalizing 1 mole of an aldehyde of the Formula (III) with 1 mole of a dialcohol of the formula

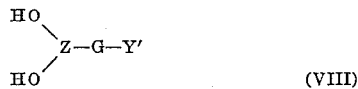

in which the radical Y' contains an epoxidizable group. Examples of dialcohols (VIII) are: Adducts of triols, such as glycerol with dicyclopentadiene; Diels-Alder adducts of monoallyl ethers of triols, such as glycerolmonallyl ether, with cyclopentadiene.

In the process of the present invention the acetals of the Formula (II) are treated with epoxidizing agents. The epoxidation of the carbon-to-carbon double bonds leading to the compounds of the present invention is performed by a conventional method, preferably with the aid of an organic per-acid such as peracetic, perbenzoic, peradipic, mono-perphthalic acid or the like. A further suitable epoxidizing agent is hypochlorous acid, in a first stage HOCl being added to the double bond and in a second stage the epoxide group being formed under the action of an agent capable of splitting off hydrogen chloride, for example a strong alkali.

In correspondence with what has been said above concerning the significance of the term "epoxidizable group" the treatment according to the invention with epoxidizing agents includes also reaction with an agent capable of splitting off hydrogen halide, such as potassium hydroxide or sodium hydroxide, upon halohydrin groups, for example the glycerol monochlorohydrin group, to form the corresponding 1:2-epoxide group or a glycidyl group.

When the acetal of the Formula (II) contains in addition to epoxidizable carbon-to-carbon double bonds halohydrin groups, the epoxidation takes place in two stages.

The epoxidation may yield, in addition to the diepoxides or polyepoxides respectively, by way of side reactions also epoxides that are wholly or only partially hydrolyzed, that is to say compounds in which the epoxide group of the poly-epoxide of the Formula (I) has been wholly or partially hydrolyzed to hydroxyl groups.

It has been observed that the presence of such by-products generally has a favorable influence on the technical properties of the cured polyepoxides. It is therefore, in general, advantageous not to isolate the pure polyepoxides from the reaction mixture.

Particularly advantageous technical properties are found, for example, in the diepoxides of the formula

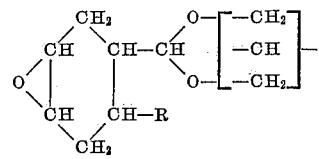
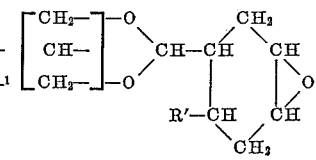
(IX)

in which R and R' each represents a hydrogen atom or a lower alkyl radical with 1 to 4 carbon atoms, $Y_1$ an aliphatic, cycloaliphatic, araliphatic or aromatic hydrocarbon radical, and $m$ and $n$ each=1 or 2; also in the diepoxides of the formula

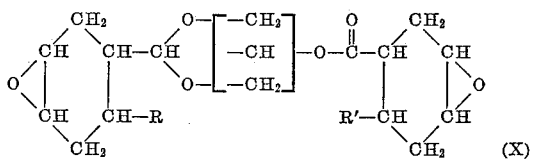 (X)

in which R and R' each represents a hydrogen atom or a lower alkyl radical with 1 to 4 carbon atoms.

Such epoxides are bright resins which are at room temperature liquid or fusible and can be converted with suitable curing agents such, for example as dicarboxylic acid anhydrides, into clear and bright, cured products having excellent technical properties.

The epoxidized acetals of the invention react with the conventional curers for epoxides compounds; they can therefore be cross-linked or respectively cured in the presence of such curing agents in the same manner as other polyfunctional epoxide compounds or epoxy resins respectively. As such curing agents there may be mentioned basic or more especially acidic compounds.

The following have proved suitable: Amines and amides, such as aliphatic and aromatic primary, secondary and tertiary amines, for example mono-, di- and tributylamines, para-phenylenediamine, bis-[para-aminophenyl]-methane, ethylenediamine, N:N-diethylethylenediamine, diethylenetriamine, tetra - [hydroxyethyl] - diethylenetriamine, triethylenetetramine, tetraethylenepentamine, N:N-dimethylpropylenediamine, trimethylamine, diethylamine, triethanolamine, Mannich's bases, piperidine, piperazine, guanidine and guanidine derivatives such as phenyl diguanidine, diphenylguanidine, dicyandiamide, formaldehyde resins with aniline, urea and melamine; polymers of aminostyrenes, polyamides, for example those prepared from aliphatic polyamines and dimerized or trimerized unsaturated fatty acids, isocyanates, isothiocyanates; polyhydric phenols, for example resorcinol, hydroquinone, bis - [4-hydroxyphenyl]-dimethylmethane, quinone, phenol-aldehyde resins, oil-modified phenol-aldehyde resins; reaction products of aluminum alcoholates and phenolates with compounds of tautomeric reaction of the type of the acetoacetic esters, Friedel-Crafts catalysts such as aluminum chloride, antimony chloride, tin tetrachloride, zinc chloride, boron trifluoride and complexes thereof with organic compounds; metal fluoborates and phosphoric acid. Preferred curing agents are polybasic carboxylic acids and anhydrides thereof, for example phthalic anhydride, methylendomethylene-tetrahydrophthalic anhydride, dodecenyl - succinic anhydride, hexahydrophthalic anhydride, hexachloro-endomethylene-tetrahydrophthalic anhydride or endomethylene-tetrahydrophthalic anhydride, or mixtures thereof; maleic or succinic anhydride. If desired, an accelerator, such as a tertiary amine or a strong Lewis base, for example an alkali metal alcoholate, and advantageously also a poly-hydroxy compound, such as hexanetriol or glycerol, may be further added.

It has been observed that when an epoxy resin of the invention is cured with a carboxylic anhydride it is of advantage to use for every gram equivalent of epoxide groups only about 0.3 to 0.9 gram equivalent of anyhydride groups. When a basic accelerator is used, such as an alkali metal alcoholate or an alkali metal salt of a carboxylic acid, up to 1.0 gram equivalent of anyhydride groups may be used.

The term "curing" as used in this context signifies the conversion of the aforementioned epoxide compounds into insoluble and infusible resins.

Accordingly, the present invention also includes curable mixtures containing an epoxidized acetal of the invention as well as a curing agent for epoxy resins, preferably a di- or polycarboxylic acid anhydride.

Advantageously, the curable mixtures of the invention further contain a share of otherwise suitable acetals whose expoxide groups however have been wholly or partially hydrolyzed to hydroxyl groups, and/or also other crosslinking poly-hydroxy compounds, such as hexanetriol. It is, of course, possible to add to the curable epoxide compounds also other epoxides such, for example, as monoglycidyl or polyglycidyl ethers of monoalcohols or polyalcohols such as butanol, 1:4-butanediol or glycerol, or of monophenols or polyphenols such as resorcinol, bis-[4 - hydroxyphenyl] - dimethylmethane or condensation products of aldehydes with phenols (novolaks); also polyglycidyl esters of polycarboxylic acids such as phthalic acid; also aminopolyepoxides such as are obtained for example by dehydrohalogenating a reaction product of an epihalohydrin with a primary or secondary amine, such as n-butylamine, aniline or 4:4'-di-(monomethylamino)-diphenyl-methane.

Furthermore, the curable epoxide compounds or mixtures thereof with curing agents can be admixed at any stage prior to the curing with fillers, plasticisers, coloring matters and the like. Suitable extenders and fillers are, for example, asphalt, bitumen, glass fibers, mica, quartz meal, cellulose, kaolin, finely dispersed silicic acid (Aerosil) or metal powders.

The mixtures of the epoxide compounds of the invention with the curing agent can be used without or with fillers, if desired in the form of solutions or emulsions, as textile, assistants, laminating resins, paints, lacquers, dipping resins, casting resins, coating compositions, pore fillers and putties, adhesives, moulding compositions or the like, as well as for the manufacture of such products. The new resins are especially valuable for use as insulating compounds for the electrical industry.

In the following, parts and percentages are by weight, the relationship between part by weight and part by volume being the same as that between the kilogram and the liter.

PREPARATION OF THE INTERMEDIATES $\Delta^3$-tetrahydrobenzal glycerol

A solution of 184 parts of glycerol, 220 parts of $\Delta^3$-tetrahydrobenzaldehyde and 4 parts of para-toluenesulfonic acid in 500 parts by volume of benzene is heated in a cyclic distillation apparatus (described by Batzer and co-workers in Makromolekulare Chemie 7, (1951) page 82) until (after about 20 hours) 25 parts by volume of water have separated; the remainder of the water of reaction is absorbed by the drying agent. The cooled solution is agitated with 100 parts by volume of water and then with 50 parts by volume of sodium carbonate solution, dried over sodium sulfate and the benzene is evaporated. The residue is subjected to fractional distillation, to yield 290 parts of a main fraction (=75% of the theoretical), boiling at 98–100° C. under a pressure of 0.4 mm. Hg.

To identify this product it is subject to catalytic hydrogenation and the hydroxyl number is determined, being 263; double bonds=5.7 equivalents (theoretical values for the compound of the empirical formula $C_{10}H_{16}O_3$: OH number=308, double bonds=5.5).

In exactly the same manner as described above equivalent amounts of the following aldehydes and triols can be condensed to yield cyclic acetals:

6-methyl-$\Delta^3$-tetrahydrobenzal glycerol

Acetal: B.P. about 100° C. under 0.4 mm. Hg pressure.

$C_{11}H_{18}O_3$—Calculated: C, 66.64; H, 9.15%. Found: C, 66.46; H, 9.14%.

Acetal from $\Delta^3$-tetrahydrobenzaldehyde and 1:2:6-hexanetriol

Acetal: B.P. 126–128° C. under 0.08 mm. Hg pressure.

$C_{13}H_{22}O_3$—Calculated: C, 68.99; H, 9.80%. Found: C, 69.15; H, 10.03%.

2:5-endomethylene-$\Delta^3$-tetrahydrobenzal glycerol 244 parts of 2:5-endomethylene-$\Delta^3$-tetrahydrobenzaldehyde and 184 parts of glycerol are condensed in a cyclic distillation apparatus in the presence of 500 parts by volume of benzene, 1 part of anhydrous zinc chloride and 1 part by volume of concentrated phosphoric acid, with 33 parts of water separating out. The solution is filtered and evaporated and the residue is distilled in a high vacuum, to yield 310 parts of the cyclic acetal boiling at 97–100° C. under 0.04 mm. Hg pressure.

$C_{11}H_{16}O_3$—Calculated: C, 67.32; H, 8.22%. Found: C, 67.18; H, 8.26%.

When equivalent amounts of aldehyde and triol are condensed as described above, the following products are obtained:

Acetal from 6-methyl-$\Delta^3$-tetrahydrobenzaldehyde and 1:2:4-butanetriol

B.P. 103–105° C. under 0.2 mm. Hg pressure.

Acetal from 6-methyl-$\Delta^3$-tetrahydrobenzaldehyde and 1:1:1-trimethylolpropane B.P. 119–120° C. under 0.2 mm. Hg pressure.

In the following examples of the performance of the present process commercial peracetic acid of about 42% strength has been used; it contains in addition to acetic acid about 3% of hydrogen peroxide, 10% of water and 1% of concentrated sulfuric acid. Unless otherwise indicated, the sulfuric acid is neutralized prior to use with about 2% of anhydrous sodium acetate.

EXAMPLE 1

198 parts of 6-methyl-$\Delta^3$-tetrahydrobenzal glycerol are added dropwise at 2–10° C. to a solution of 49.5 parts of phosgene in 800 parts by volume of anhydrous benzene. The mixture is allowed to heat up to room temperature, the pyridine hydrochloride is filtered off and the filtrate is washed in the cold with 2 N-hydrochloric acid, 2 N-sodium hydroxide solution and a molar monosodium phosphate solution. The solution is dried over anhydrous sodium sulfate, filtered and evaporated, whereby the carbonate is obtained as a highly viscous liquid.

For analytical purposes a specimen of the product is distilled.

B.P. 216–217° C. under 0.02 mm. Hg pressure, $n_D^{20}=1.5009$.

$C_{23}H_{34}O_7$—Calculated: C, 65.38; H, 8.11%. Found: C, 65.12; H, 8.07%.

158 parts of the unsaturated carbonate are dissolved in 675 parts of ethyl acetate and the solution is treated with 163 parts of peracetic acid. The mixture is first cooled and then heated to and maintained at 40° C. After 5½ hours the theoretical amount of peracetic acid has been consumed. The whole is diluted with 500 parts by volume of ethyl benzene, washed twice with 100 parts of water on each occasion and evaporated in a water-jet vacuum after having been diluted with 2000 parts by volume of ethyl benzene. The residue is an amorphous resin containing 3.60 epoxide equivalents per kg.

The epoxide compound obtained by the procedure of this example has the formula

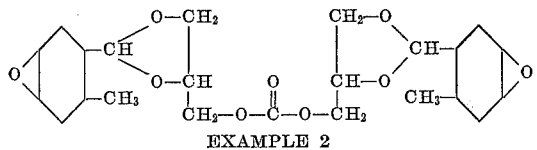

EXAMPLE 2

A mixture of 396 parts of 6-methyl-Δ³-tetrahydrobenzal glycerol, 146 parts of oxalic acid diethyl ester, 2 parts of sodium methylate and 500 parts by volume of toluene is heated on an oil bath maintained at about 130–150° C. The alcohol formed is distilled off as an azeotropic mixture with toluene through a Raschig column of 30 cm. height. When 90% of the theoretical amount of ethanol have passed over, the solution is filtered and evaporated to leave the oxalate as a highly viscous liquid.

For analytical purposes a specimen of the product is distilled.

B.P. 232–235° C. under 0.04 mm. Hg pressure, $n_D^{20} = 1.5043$.

$C_{24}H_{34}O_8$—Calculated: C, 63.98; H, 7.61%. Found: C, 64.17; H, 7.59%.

A solution of 360 parts of the oxalate in 1200 parts of ethyl acetate is reacted for 4¼ hours with 350 parts of peracetic acid. The mixture is cooled, diluted with 4600 parts by volume of ethyl benzene, washed twice with 200 parts of water on each occasion and evaporated in a water-jet vacuum. The residue is freed from the last remnants of solvent by being heated for 3 hours at 120° C. in a high vacuum. The product contains 2.89 epoxide equivalents per kg.

The epoxide compound obtained by the procedure of this example has the formula

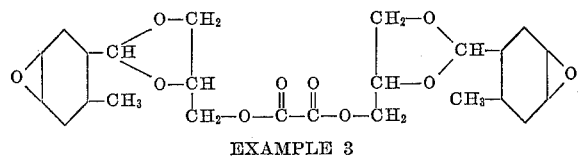

EXAMPLE 3

A mixture of 297 parts of 6-methyl-Δ³-tetrahydrobenzal glycerol, 110 parts of adipic acid, 1 part of para-toluene-sulfonic acid and 1000 parts by volume of toluene is boiled in a cyclic distillation apparatus. After 10 hours, 21 parts of water have separated.

The solution is then cooled to 30° C. and in the course of one hour 320 parts of peracetic acid are added in portions. After 2 hours at 30° C. the theoretical amount of peracetic acid has been consumed. The solution is washed with water and 2 N-sodium carbonate solution until it is free from acid, dried over anhydrous sodium sulfate, filtered and evaporated, to leave a viscid resin containing 3.00 epoxide equivalents per kg.

The epoxide compound obtained by the procedure of this example has the formula

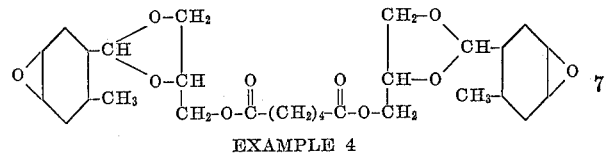

EXAMPLE 4

A mixture of 396 parts of 6-methyl-Δ³-tetrahydrobenzal glycerol, 100 parts of succinic anhydride, 1 part of para-toluene-sulfonic acid and 250 parts of ethyl benzene is boiled for 20 hours in a cyclic distillation apparatus, while 15 parts of water are separated.

The succinic acid ester is epoxidized with 450 parts of peracetic acid for 3 hours at 30° C. The solution is washed with water and 2 N-sodium carbonate solution until it is free from acid., dried over anhydrous sodium sulfate, filtered and evaporated, to yield a viscid resin containing 2.21 epoxide equivalents per kg.

The epoxide compound obtained by the procedure of this example has the formula

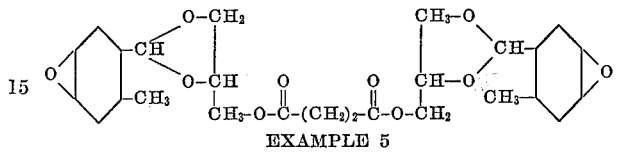

EXAMPLE 5

A mixture of 36.8 parts of Δ³-tetrahydrobenzal glycerol, 400 parts of dry benzene and 20 parts of pyridine is treated at 3° C. dropwise with 23.9 parts of sebacic acid dichloride while being cooled with a mixture of ice and sodium chloride. The mixture is warmed up to room temperature, washed three times with 100 parts of water on each occasion, dried over anhydrous sodium sulfate and evaporated, to yield 51.8 parts of sebacate of tetrahydrobenzal glycerol.

45.5 parts of the above product are dissolved in 300 parts of ethyl acetate and reacted for 6 hours at 40° C. with 45 parts of peracetic acid. The cooled solution is diluted with 600 parts by volume of ethyl benzene, washed twice with 100 parts of water on each occasion, treated with 900 parts by volume of ethyl benzene and evaporated. The last remnants of the solvent are removed in a high vacuum at 120° C. Yield: 43 parts of a liquid diepoxide containing 3.00 epoxide equivalents per kg.

The epoxide compound obtained by the procedure of this example has the formula

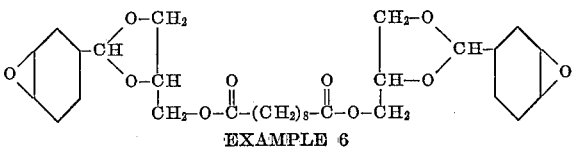

EXAMPLE 6

A mixture of 92 parts of Δ³-tetrahydrobenzal glycerol, 37 parts of phthalic anhydride, 1 part of para-toluene-sulfonic acid and 180 parts by volume of benzene is heated in a cyclic distillation apparatus for 5 hours at the boil. The solution is diluted with 100 parts by volume of benzene and treated with 20 parts of sodium acetate. In the course of 30 minutes 106 parts of peracetic acid of 42% strength are added while cooling and the mixture is allowed to react for one hour at 30° C. while being stirred. The solution is washed twice with 200 parts of water and twice with 40 parts by volume of saturated sodium carbonate solution (until an alkaline reaction has been established) and again with 50 parts of water, dried over sodium sulfate and evaporated, to leave a viscous resin containing 3.5 epoxide equivalents per kg.

The epoxide compound obtained by the procedure of this example has the formula

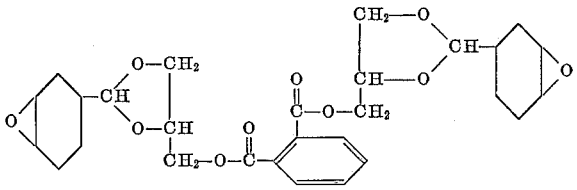

EXAMPLE 7

A mixture of 594 parts of 6-methyl-Δ³-tetrahydrobenzal glycerol, 420 parts of Δ³-tetrahydrobenzoic acid methyl ester, and 21 parts of sodium methylate solution (prepared from 2 parts of sodium and 19 parts of methanol) formed being distilled off through a 30 cm. high Raschig column. When the distillation ceases, 500 parts by volume of toluene are added, whereupon an azeotropic mixture of methanol and toluene passes over at 64° C. The volume distillate contains the theoretical amount of methanol. The mixture is allowed to cool, filtered and distilled. The resulting Δ³-tetrahydrobenzoic acid ester boils at 153–158° C. under 0.2 mm. Hg pressure.

A solution of 432 parts of the above ester in 1000 parts by volume of benzene is treated with 60 parts of anhydrous sodium acetate. While stirring and cooling, 600 parts of peracetic acid of 44.6% strength are added within 40 minutes at 30° C. The mixture is allowed to react for about 2 hours longer at 30° C., cooled and washed three times with 350 parts of ice water and twice with 300 parts by volume of 2 N-sodium carbonate solution. The aqueous phase is extracted with 600 parts by volume of benzene. The solution of the epoxide is dried over sodium sulfate, filtered and evaporated, to yield 429 parts of a thickly liquid, colorless product containing 5.02 epoxide equivalents per kg.

The epoxide compound obtained by the procedure of this example has the formula

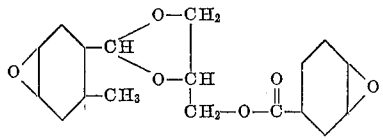

EXAMPLE 8

A mixture of 49.5 parts of 6-methyl-Δ³-tetrahydrobenzal glycerol, 500 parts by volume of dry benzene and 32 parts of pyridine is treated at 0° C. with 50.7 parts of undecylenic acid chloride while being cooled with a mixture of ice and sodium chloride. After having heated up to room temperature, the mixture is filtered and the filtrate is washed with 200 parts by volume of 2 N-hydrochloric acid, 200 parts by volume of 2 N-sodium carbonate solution and 100 parts by volume of molar monosodium phosphate solution and evaporated. Distillation of the residue under 0.02 mm. Hg pressure yields at 160–162° C. the undecylenic acid ester of 6-methyl-Δ³-tetrahydrobenzal glycerol in the form of a thinly liquid, colorless oil.

$n_D^{20} = 1.4793$.

$C_{22}H_{36}O_4$—Calculated: C, 72.49; H, 9.96%. Found: C, 72.53; H, 10.00%.

A mixture of 60 parts of the undecylenic acid ester, 235 parts of ethyl acetate and 80 parts of peracetic acid is allowed to react for 14 hours at 40° C. and then for 7 hours at about 30° C., after which time the theoretical amount of peracetic acid has been consumed. The solution is diluted with 500 parts by volume of ethylbenzene, washed twice with 150 parts of water, treated with another 250 parts by volume of ethylbenzene and evaporated in a water-jet vacuum, to yield 60 parts of a thinly liquid diepoxide containing 3.86 epoxide equivalents per kg.

The epoxide compound obtained by the procedure of this example has the formula

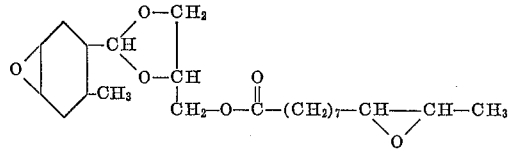

EXAMPLE 9

A mixture of 36.8 parts of Δ³-tetrahydrobenzal glycerol, 200 parts by volume of dry benzene and 25 parts of pyridine is treated at −3° C. portionwise with 60.2 parts of oleic acid chloride, then heated to room temperature and the solution of the ester formed is washed four times with 100 parts of water, dried over anhydrous sodium sulfate, filtered and evaporated. The residue consists of 89.3 parts of the oleic acid ester of tetrahydrobenzal glycerol.

75.4 parts of the ester so obtained are mixed with 300 parts of ethyl acetate and in the course of ½ hour treated portionwise with 110 parts of peracetic acid. The whole is reacted for 3 hours at 40° C. The solution is diluted with 400 parts by volume of ethylbenzene, washed twice with 100 parts of water, treated with another 800 parts by volume of ethylbenzene and evaporated. The residue is a liquid epoxide containing 3.92 epoxide equivalents per kg.

The epoxide compound obtained by the procedure of this example has the formula

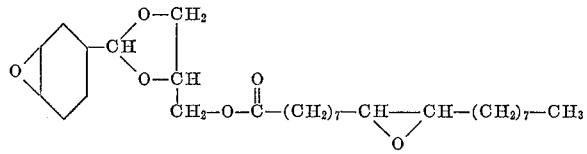

EXAMPLE 10

A mixture of 921 parts of Δ³-tetrahydrobenzal glycerol, 5 parts by volume of boron trifluoride of 48% strength in ether is heated to 55° C. and treated dropwise with 462 parts of epichlorohydrin, while maintaining the temperature at 55° C. by external cooling. The mixture is then allowed to cool to room temperature and neutralized with 1.8 parts of powdered sodium hydroxide. (An identical reaction product is obtained by condensing 1 molecular proportion of epichlorohydrin with 1 molecular proportion of glycerol and acetalizing the resulting glycerolmonochlorohydrin ether with Δ³-tetrahydrobenzaldehyde).

The whole reaction product is dissolved in 2500 parts of ethyl acetate and slowly treated with 1100 parts of peracetic acid. After 6 hours at 30° C. the theoretical amount of peracetic acid has been consumed. The solution is diluted with 2000 parts by volume of ethylbenzene, washed with 1500 parts of water, treated with 3000 parts by volume of ethylbenzene and evaporated in a water-jet vacuum, to yield a product which contains 2.64 epoxide equivalents per kg.

A mixture of 1200 parts of the above monoepoxide and 2000 parts by volume of dry benzene is treated with 165 parts of finely powdered sodium hydroxide while being cooled at 20–25° C. After one hour the sodium chloride formed is filtered off. The filtrate is washed with 250 parts by volume of a molar monosodium phosphate solution, dried over sodium sulfate, filtered and evaporated, to yield a liquid diepoxide containing 5.56 epoxide equivalents per kg.

The epoxide compound obtained by the procedure of this example has the formula

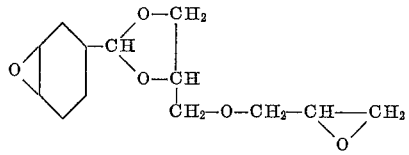

EXAMPLE 11

A mixture of 297 parts of 6-methyl-Δ³-tetrahydrobenzal glycerol, 500 parts by volume of dry benzene and 1.5 parts by volume of boron trifluoride of 48% strength in ether is heated to 75° C. 139 parts of epichlorohydrin are stirred in dropwise. By supplying slight cooling the temperature is prevented from rising above 81° C. On completion of the addition of epicholorhydrin the whole is allowed to cool to room temperature and in the course of 15 minutes 60 parts of powdered sodium hydroxide are stirred in, while maintaining the temperature at 25° C. by cooling. After another 23 minutes the mixture is filtered and the filtrate is evaporated, and the residue is treated with 0.2 part by volume of glacial acetic acid and rapidly distilled (B.P. 117–142° C. under about 0.3 mm. Hg pressure). Fractional distillation through a Vigreux column yields the glycidyl ether boiling at 131–137° C. under 0.4 mm. Hg pressure. The product contains 3.90 epoxide equivalents per kg. (=99% of the theoretical).

*Analysis.*—$C_{14}H_{22}O_4$, Calculated: C, 66.11; H, 8.72; O, 25.17%. Found: C, 66.17; H, 8.80; O, 25.10%.

178 parts of the above glycidyl ether are diluted with 500 parts by volume of benzene and treated with 15 parts of anhydrous sodium acetate.

While cooling at about 30° C., 145 parts of peracetic acid of 44.6% strength are added in portions within ½ hour. The whole is allowed to react for 1 hour and 50 minutes longer at about 30° C. and then cooled. The benzene solution of the epoxide is washed three times with 200 parts by volume of ice water, 200 parts by volume of 2 N-sodium carbonate solution and 150 parts by volume of monosodium phosphate solution, and the aqueous phases are extracted with 400 parts by volume of benzene. The combined benzene extracts are dried over anhydrous sodium sulfate, filtered and evaporated, to yield 157 parts of a thinly liquid diepoxide containing 6.5 epoxide equivalents per kg. (=88% of the theoretical).

The epoxide compound obtained by the procedure of this example has the formula

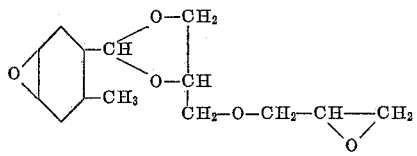

EXAMPLE 12

99 parts of the dioxolane obtained from 1:2:4-butanetriol and $\Delta^3$-tetrahydrobenzaldehyde are heated to about 45° C. and treated with 0.3 part by volume of boron trifluoride of about 48% strength in ether and dropwise with 46.3 parts of epichlorohydrin; the temperature is allowed to rise to 83° C. 15 minutes after completion of the addition of epichlorohydrin 2 parts of anhydrous sodium acetate are added, the whole is diluted with 250 parts of ethyl acetate and treated portionwise with 111 parts of peracetic acid. After the mixture has reacted for 6 hours at 40° C. it is diluted with 200 parts by volume of ethylbenzene, washed twice with 50 parts of water, treated with 750 parts by volume of ethylbenzene and evaporated in a water-jet vacuum.

The resulting monoepoxide is dissolved in 250 parts by volume of benzene and 20 parts of finely powdered sodium hydroxide are added. The mixture is allowed to react for 2 hours at 21–26° C. The sodium chloride formed is filtered off and the filtrate is washed with 50 parts by volume of a molar monosodium phosphate solution, dried over anhydrous sodium sulfate, filtered and evaporated, to yield a liquid diepoxide containing 5.86 epoxide equivalents per kg.

The epoxide compound obtained by the procedure of this example has the formula

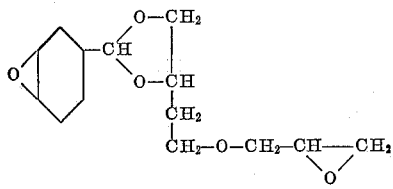

EXAMPLE 13

When the meta-dioxane derivative obtained from 6-methyl-tetrahydrobenzaldehyde and 1:1:1-trimethylolpropane is reacted as described in Example 12, a liquid diepoxide is obtained which contains 4.45 epoxide equivalents per kg.

The epoxide compound obtained by the procedure of this example has the formula

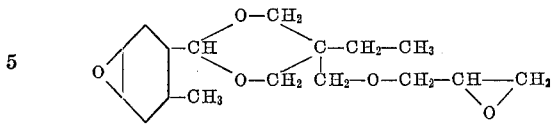

EXAMPLE 14

113 parts of the dioxolane obtained from 1:2:6-hexanetriol and $\Delta^3$-tetrahydrobenzaldehyde are reacted in the presence of 0.3 part by volume of boron trifluoride of 48% strength in ether with 46.3 parts of epichlorohydrin at 70° C.

After cooling, the product is treated with 2 parts of anhydrous sodium acetate and diluted with 300 parts of ethyl acetate. 110 parts of peracetic acid are then added in portions and the mixture is allowed to react for 3 hours at 40° C., then diluted with 1000 parts by volume of ethylbenzene, washed twice with 150 parts of water, treated with another 500 parts by volume of ethylbenzene and evaporated in vacuo. The product is taken up in 500 parts by volume of benzene and dehydrohalogenated at 25° C. with 20 parts of finely powdered sodium hydroxide. The mixture is filtered and the filtrate is washed with 50 parts by volume of a molar monosodium phosphate solution, dried and evaporated, to yield 115 parts of a liquid diepoxide containing 5.51 epoxide equivalents per kg.

The epoxide compound obtained by the procedure of this example has the formula

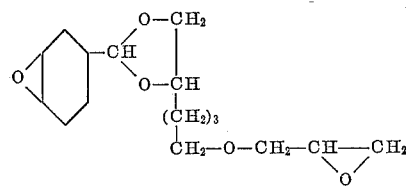

EXAMPLE 15

A mixture of 215 parts of distilled diglycerol, 300 parts of $\Delta^3$-tetrahydrobenzaldehyde, 750 parts by volume of benzene, 3 parts of anhydrous zinc chloride and 3 parts by volume of phosphoric acid is boiled in a cyclic distillation apparatus while being stirred. After 4½ hours 43 parts of water have separated. The mixture is filtered and evaporated, towards the end in a high vacuum at 120° C., and there are obtained 430 parts of the bisdioxolane.

A solution of the above dioxolane in 1500 parts by volume of benzene is treated with 20 parts of anhydrous sodium acetate. While stirring and cooling 550 parts of peracetic acid of 44.6% strength are added portionwise in the course of one hour at 30° C. The mixture is allowed to react for 2 hours at 30° C. and then cooled with ice. The solution of the epoxide is washed 3 times with 300 parts of water and twice with 300 parts by volume of 2 N-sodium carbonate solution until it is free from acid. The aqueous phases are extracted with 500 parts by volume of benzene. The benzene phases are combined, dried over anhydrous sodium sulfate and evaporated, to yield 399 parts of thickly liquid diepoxide containing 4.55 epoxide equivalents per kg.

The epoxide compound obtained by the procedure of this example has the formula

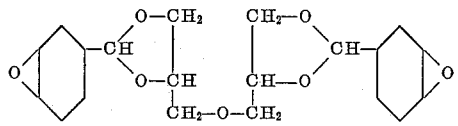

EXAMPLE 16

159 parts of crude diglycerol (obtained in known manner for glycerol and glycerol-$\alpha$-monochlorohydrin in the presence of sodium hydroxide solution) in 500 parts by volume of benzene are condensed with 220 parts of Δ³-tetrahydrobenzaldehyde in the presence of 1 part of zinc chloride and 1 part by volume of concentrated phosphoric acid in a cyclic distillation apparatus, while 29 parts of water separate.

The filtered solution of the bis-dioxolane is treated protionwise at about 30° C. in the course of ½ hour with 420 parts of peracetic acid. The mixture is allowed to react for 75 minutes at 30° C. and then washed with ice water and 2 N-sodium carbonate solution until it is free from acid. The solution is dried over anhydrous sodium sulfate, filtered and evaporated. The residue is a highly viscous resin containing 4.62 epoxide equivalents per kg.

The epoxide compound obtained by the procedure of this example has the formula

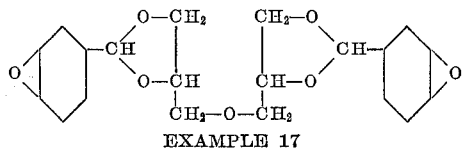

EXAMPLE 17

83 parts of distilled diglycerol are condensed in a cyclic distillation apparatus with 130 parts of 6-methyl-Δ³-tetrahydrobenzaldehyde in the presence of 500 parts by volume of benzene, 0.5 part of zinc chloride and 0.5 part by volume of concentrated phosphoric acid, during which 15 parts of water separate. The solution is filtered and evaporated and the residue is distilled in a high vacuum, to yield 156 parts of bisacetal boiling at 189–199° C. under 0.2 mm. Hg pressure.

A solution of 141.5 parts of the bis-acetal in 500 parts of ethyl acetate is treated portionwise with 165 parts of peracetic acid. The temperature is maintained at 40° C., initially by cooling and then by supplying external heat. After 3½ hours 97% of the theoretical amount of peracetic acid have been consumed. The mixture is cooled, diluted with 500 parts by volume of ethylbenzene, washed twice with 150 parts of water, treated with 1000 parts by volume of ethylbenzene and evaporated under vacuum. The last remnants of the solvent are removed in a high vacuum at 120° C. Yield: 143 parts of an epoxy resin containing 3.75 epoxide equivalents per kg.

The epoxide compound obtained by the procedure of this example has the formula

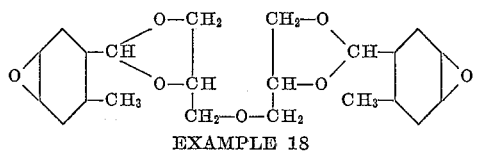

EXAMPLE 18

The bis-acetal obtained from 125 parts of 2:5-endomethylene-Δ³-tetrahydrobenzaldehyde instead of from 6-methyl-Δ³-tetrahydrobenzaldehyde by the method described in Example 17 boils at 202–204° C. under a pressure of 0.2 mm. Hg.

When the product is epoxidized for 3 hours, the theoretical amount peracetic acid is consumed. The resulting diepoxide is an amorphous, brittle resin; its epoxide content cannot be determined by means or hydrogen bromide.

The epoxide compound obtained by the procedure of this example has the formula

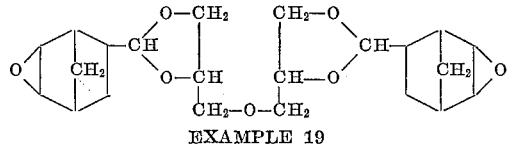

EXAMPLE 19

112 parts of glycerol- monotricyclodecenyl ether (adduct from dicyclopentadiene and glycerol) are condensed in a cyclic distillation apparatus in the presence of 0.3 part of zinc chloride, 0.3 part by volume of concentrated phosphoric acid and 500 parts by volume of benzene with 60 parts of Δ³-tetrahydrobenzaldehyde. The solution of the acetal formed is filtered and evaporated and the residue is distilled, to yield 152 parts of a product boiling at 165–172° C. under 0.02 mm. Hg pressure.

$C_{20}H_{28}O_3$, Calculated: C, 75.91; H, 8.92%. Found: C. 75.80; H, 8.88%.

A mixture of 111 parts of the above acetal and 300 parts of ethyl acetate is reacted for 5 hours at 40° C. with 150 parts of peracetic acid, then cooled, diluted with 500 parts by volume of ethylbenzene and washed twice with 150 parts of water. Another 500 parts by volume of ethylbenzene are added to the solution and the mixture is evaporated on a water bath in a water-jet vacuum, to yield a viscous diepoxide containing 5.22 epoxide equivalents per kg.

The epoxide compound obtained by the procedure of this example has the formula

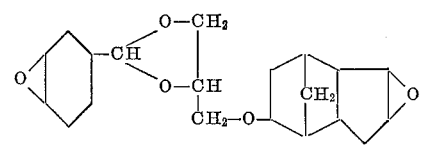

EXAMPLE 20

A mixture of 180 parts of 3-vinyl-2:4-dioxospiro(5:5) undecene-8 (prepared by acetalizing Δ³-cyclohexene-1:1-dimethanol with acrolein) and 184 parts of Δ³-tetrahydrobenzal glycerol is heated to 80° C., and 1 part of sulfuric acid is added, whereupon an evolution of heat is observed. The temperature is maintained for 2½ hours at 90° C., first by cooling and then by heating. The acid is then neutralized with 1 part of anhydrous sodium carbonate. By heating the reaction product to 112° C. under 0.1 mm. Hg pressure only 6 parts of unreacted starting materials can be distilled off, that is to say that the additive combination proceeds substantially quantitatively. There are obtained 353 parts of the adduct in the form of a viscous, dark liquid.

A solution of 353 parts of the above adduct in 1050 parts of benzene is treated with 25 parts of anhydrous sodium acetate and heated to 35° C. In the course of 20 minutes 394 parts of peracetic acid of 41.2% strength are then added with vigorous stirring and the mixture is stirred for 2¾ hours at 35° C. and then cooled. The aqueous phase is separated, washed three times with 250 parts by volume of water, neutralized with 40 parts by volume of sodium hydroxide solution of 30% strength and finally washed twice with 150 parts by volume of water. The benzene is distilled off and the product is freed from the last remnants of the solvent by being heated to 100° C. under 0.1 mm. Hg pressure, to yield 320 parts of a viscous yellow liquid containing 4.75 epoxide equivalents per kg. (=94% of the theoretical) and consisting substantially of the diepoxide of the formula

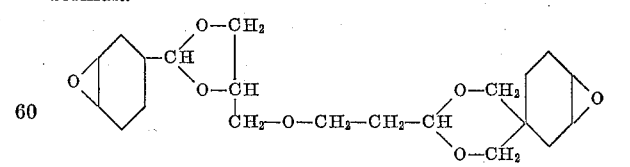

EXAMPLE 21

65 parts of the epoxy resin prepared as described in Example 3 are melted at 120° C. with 28.9 parts of phthalic anhydride and poured into an aluminum mould (40 x 10 x 140 mm.).

The mixture is cured for 3 hours at 120° C., then for 3 hours at 160° C. and finally for 24 hours at 200° C. The resulting moulding has the following properties:

Bending strength _____ 11.6 kg./sq. mm.
Impact banding strength _____ 13.5 cm. kg./sq. cm.
Thermal stability according to
Martens _____ 130° C.

EXAMPLE 22

75 parts of the diepoxide prepared as described in Example 7 and 18.8 parts of succinic anhydride are melted at 120° C. and poured into an aluminum mold (40 x 10 x 140 mm.).

The mixture is cured for 16 hours at 120° C., then for 6 hours at 160° C. and finally for 12 hours at 200° C. The resulting moulding has the following properties:

Bending strength _____ 9.0 kg./sq. mm.
Impact bending strength _____ 6.8 cm. kg./sq. cm.
Thermal stability according to
  Martens _____ 175° C.

EXAMPLE 23

65 parts of the diepoxide prepared as described in Example 15 are melted with 28.4 parts of phthalic anhydride at 120–130° C. and poured into an aluminum mould (40 x 10 x 140 mm.).

The mixture is cured for 24 hours at 140° C. and then for 24 hours at 200° C. The resulting moulding has the following properties:

Bending strength _____ 10.1 kg./sq. mm.
Impact bending strength _____ 7.9 cm. kg./sq. cm.
Thermal stability according to
  Martens _____ 187° C.

EXAMPLE 24

70 parts of the diepoxide prepared as described in Example 15 are melted with 21.2 parts of phthalic anhydride at 120° C. The resulting mixture has at 120° C. a viscosity below 20 centipoises and after 65 minutes of 1500 centipoises. The melt is poured over plates of glass to form layers 0.1 mm. and 1 mm. thick respectively and then hardened for 24 hours at 140° C. and subsequently for 24 hours at 200° C. The cured films are clear, substantially colorless, elastic and adhere very firmly to the support. They remain intact after having been immersed for one hour at room temperature in 5 N-sulfuric acid, 5 N-sodium hydroxide solution, water, acetone and chlorobenzene.

EXAMPLE 25

74 parts of the epoxy resin prepared as described in Example 16 and 32.8 parts of phthalic anhydride are melted at 120° C. and poured into an aluminum mould (40 x 10 x 140 mm.).

The mixture is cured for 24 hours at 140° C. The resulting moulding has the following properties:

Bending strength _____ 8.1 kg./sq. mm.
Impact bending strength _____ 3.8 cm. kg./sq. cm.
Thermal stability according to
  Martens _____ 173° C.

EXAMPLE 26

68.5 parts of the epoxy resin prepared as described in Example 10 are melted at 120° C. with 36.5 parts of phthalic anhydride and poured into an aluminum mould (40 x 10 x 140 mm.). The mixture is cured for 4 hours at 80° C. and then for 24 hours at 140° C. The resulting moulding has the following properties:

Bending strength _____ 10.9 kg./sq. mm.
Impact bending strength _____ 12.1 cm. kg./sq. cm.
Thermal stability according to
  Martens _____ 147° C.

What is claimed is:
1. A diepoxide of the formula

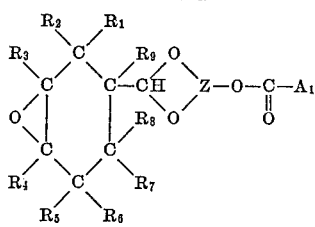

in which $R_1$ to $R_7$ and $R_9$ are hydrogen and together $R_1$ and $R_5$ form the methylene group, $R_8$ is a member selected from the group consisting of hydrogen and methyl, Z represents the hydrocarbon radical obtained by removing the hydroxyl groups from a saturated aliphatic trihydric alcohol with 3 to 6 carbon atoms and $A_1$ is epoxycycloalkyl wherein the cycloaliphatic ring is a six-membered ring, the acetal ring

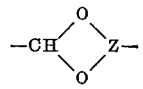

being an at least five-membered and at most six-membered ring.

2. The compound of the formula

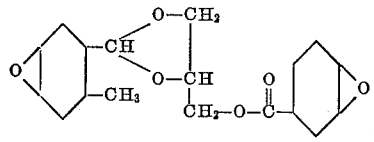

3. The compound of the formula

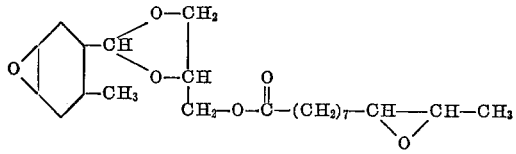

4. The compound of the formula

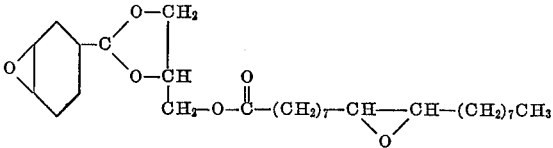

No references cited.

WALTER A. MODANCE, *Primary Examiner.*
NICHOLAS S. RIZZO, *Examiner.*